United States Patent
Ali et al.

(10) Patent No.: US 11,580,723 B2
(45) Date of Patent: Feb. 14, 2023

(54) SCENE-AWARE OBJECT DETECTION

(71) Applicant: INVISION AI, INC., Toronto (CA)

(72) Inventors: Karim Ali, Toronto (CA); Carlos Joaquin Becker, Lausanne (CH)

(73) Assignee: INVISION AI INC., Toronto (CA)

( * ) Notice: Subject to any disclaimer, the term of this patent is extended or adjusted under 35 U.S.C. 154(b) by 31 days.

(21) Appl. No.: 17/187,225

(22) Filed: Feb. 26, 2021

(65) Prior Publication Data

US 2021/0271875 A1   Sep. 2, 2021

Related U.S. Application Data

(60) Provisional application No. 62/983,136, filed on Feb. 28, 2020.

(51) Int. Cl.
 *G06K 9/00* (2022.01)
 *G06V 20/00* (2022.01)
 *G06K 9/62* (2022.01)
 *G06V 10/25* (2022.01)

(52) U.S. Cl.
 CPC .......... *G06V 20/00* (2022.01); *G06K 9/6232* (2013.01); *G06V 10/25* (2022.01)

(58) Field of Classification Search
 CPC ........ G06V 20/00; G06V 10/25; G06V 10/92; G06V 20/52; G06V 20/593; G06K 9/6232; G06K 9/6217
 See application file for complete search history.

(56) References Cited

U.S. PATENT DOCUMENTS

| | | | |
|---|---|---|---|
| 10,269,125 B1 * | 4/2019 | Kim | G06T 7/248 |
| 2020/0175372 A1 * | 6/2020 | Sharma | G06N 3/0418 |
| 2021/0097354 A1 * | 4/2021 | Amato | G06V 40/10 |
| 2021/0181758 A1 * | 6/2021 | Das | G01S 17/931 |
| 2021/0247201 A1 * | 8/2021 | Hori | G01C 21/3644 |
| 2021/0263525 A1 * | 8/2021 | Das | G06K 9/6289 |
| 2021/0271905 A1 * | 9/2021 | Creusot | G06V 20/58 |

* cited by examiner

*Primary Examiner* — Dhaval V Patel
(74) *Attorney, Agent, or Firm* — Norton Rose Fulbright Canada LLP; Maya Medeiros (57) ABSTRACT

Embodiments described herein provide systems and processes for scene-aware object detection. This can involve an object detector that modulates its operations based on image location. The object detector can be a neural network detector or a scanning window detector, for example.

20 Claims, 3 Drawing Sheets

FIG. 1

FIG. 2 receive sensor data
302 process sensor data based on location and scale
304 generate output data to define object(s) within sensor data
306 transmit output data defining object(s) within sensor data
308

SCENE-AWARE OBJECT DETECTION

FIELD

The present disclosure generally relates to the field of machine learning and computer vision.

INTRODUCTION

Embodiments described herein relate to systems and methods for object detection. Object detection involves detecting instances of objects in digital images or sequences of digital images.

Object detection can be defined as the task of locating and quantifying the spatial extent of specific object categories in images or sequence of images. The spatial extent of an object can be defined by a bounding box, ellipsoid or outline. Example categories of objects include people, faces, cars.

Object detection can involve rule-driven techniques and data-driven techniques relying on machine learning (discriminative or generative). These systems learn by example. For example, labelled data are fed into the system during the training phase. The labelled data can be in the form of images with bounding boxes together with category labels around the objects of interests, for example. The training phase optimizes a statistical error function encouraging the system to discover features that distinguish (discriminate) the specified objects against the negative classes consisting of the rest-of-the-world. Once training is complete, the system can be used in testing to produce bounding boxes and labels around the objects of interests. By relying on ever increasing training data set sizes together with models containing increasingly high number of parameters, recent methods have been able to obtain increasingly lower error rates.

Detection models can be limited to the reliable detection of pose-constrained categories, such as, for example, frontal face detection utilized in modern day cameras. An example detection model could consist of as many as 10,000 parameters with positive face training data numbering in the tens of thousands and negative (rest-of-the-world) data numbering in the tens of millions. Successful training methods can involve Boosted Decision Trees, Random Forests and Support Vector Machines. These techniques have been shown to be extremely successful for the detection of categories of objects with limited variations in pose while also being characterized by high-localization accuracy. Detection of more complex categories could be achieved by pose-partitioning the training data and training a collection of pose-dedicated detectors. Pose-partitioning the training data can involve labeling the positive data for pose and splitting the data according to different observed poses. There is a trade-off between the granularity of the partition and the availability of sufficient amounts of training data in each partition. Additionally, compelling the pose categories to compete could result in suboptimal performance. These methods are computationally efficient and can benchmark at above 30 fps (30 images per seconds) on modern single core CPUs.

Other detection models are based on multi-layer deep Convolutional Neural Networks (CNN) and allow for the reliable detection of more pose-diverse categories. Example detection models generally contain over 1 million parameters, and are trained to detect over 20 categories with positive data samples numbering in the hundreds of thousands per category and negative data numbering in the hundreds of millions. These models contain enough capacity to model strong variations in pose and their hierarchical topologies encourage both inter-category and intra-category pose sharing of features at earlier layers. In effect, the increased capacity of these models offers a solution to the aforementioned data partitioning problem allowing for pose-diverse object categories to be learned via data aggregation. This comes at the cost of computational efficiency at runtime. These methods are computationally demanding and today benchmark in seconds (2 s-30 s) per image on modern single core CPUs.

SUMMARY

Embodiments described herein provide systems and processes for scene-aware object detection.

Embodiments described herein provide a system for detecting an object within sensor data. The system has a processor coupled to memory programmed with executable instructions for an interface to receive tracking data that defines the detected object within the sensor data. The system has an object detector for detecting the object within the sensor data to generate the tracking data. The object detector can be configured to modulate its operations based on a location of the sensor data and transmit the tracking data. The tracking data defines a spatial extent of the object. The tracking data can be referred to as output data. The object detector modulates its operations by the location of the objects. The location is based on the presentation object within the sensor data. Based on the location, the objects will present in the sensor data in different ways.

In some embodiments, the object detector uses a function that changes based on the location of the sensor data to process the sensor data for detecting the object.

In some embodiments, the system has a feature extractor to extract features from the sensor data based on the location for the object detector.

In some embodiments, the object detector uses features or filters that modulate based on the location to process the sensor data for detecting the object.

In some embodiments, the object detector uses the features or filters by parameterizing features by the location.

In some embodiments, the object detector is a neural network based object detector. The object detector parameterizes transformation operations by the location.

In some embodiments, the object detector selects, for the location, an appropriate filter or transformation for parameterizing the filter operations.

In some embodiments, the object detector is a neural network based object detector. The object detector implements unsupervised pruning of filters with low activations across layers of the neural network. The pruning can be performed at the location independently to remove different filters for the location.

Embodiments described herein provide a method for detecting an object within sensor data. The method involves processing the sensor data to detect the object using an object detector that modulates its operations based on location of the sensor data. The method involves generating output data that defines the detected object within the sensor data based on the processed sensor data.

In some embodiments, processing the sensor data involves using a function that changes based on the location of the sensor data.

In some embodiments, processing the sensor data involves using a feature extractor to extract features from the sensor data based on the location for a neural network of the object detector.

In some embodiments, processing the sensor data involves using features or filters that modulate based on the location.

In some embodiments, processing the sensor data involves parameterizing features or filters by the location.

In some embodiments, the method involves selecting, for the location, an appropriate filter or transformation for parameterizing the filter operations using the object detector.

In some embodiments, the method involves unsupervised pruning of filters with low activations across layers of a neural network of the object detector, the pruning being performed at the location independently to remove different filters for the location.

Embodiments described herein provide a method for producing an object detector for detecting objects within sensor data, the object detector modulating its operations based on location of the sensor data. The method involves defining features or filters that modulate based on a location of a plurality of locations, and training the object detector using training data processed based on the defined features or filters.

In some embodiments, the method involves defining the features or filters involves parameterizing features by the location.

In some embodiments, the object detector is a neural network based object detector, wherein training involves parameterizing transformation operations by the location.

In some embodiments, training involves selecting, for the location, an appropriate filter or transformation for parameterizing the filter operations.

In some embodiments, the method involves, for the location, unsupervised pruning of filters with low activations across layers of the neural network detector, the pruning being performed at each image location independently to remove different filters for different image locations.

Embodiments described herein provide a system method for producing an object detector for detecting objects in sensor data. The object detector modulating its operations based on location of the sensor data. The system involves a processor coupled to memory storing executable instructions for causing the processor to define features or filters that modulate based on a location of a plurality of locations, and train the object detector using training data processed based on the defined features or filters.

Embodiments described herein provide a method for detecting a target object within sensor data associated with a location or viewpoint or acquisition point. The method involves locating and quantifying a spatial extent of the target object within the sensor data using an object detector that modulates its operations based on the location, and generating tracking data defining the spatial extent of the target object within the sensor data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings.

Embodiments described herein provide systems and processes for scene-aware object detection.

Figure 1:
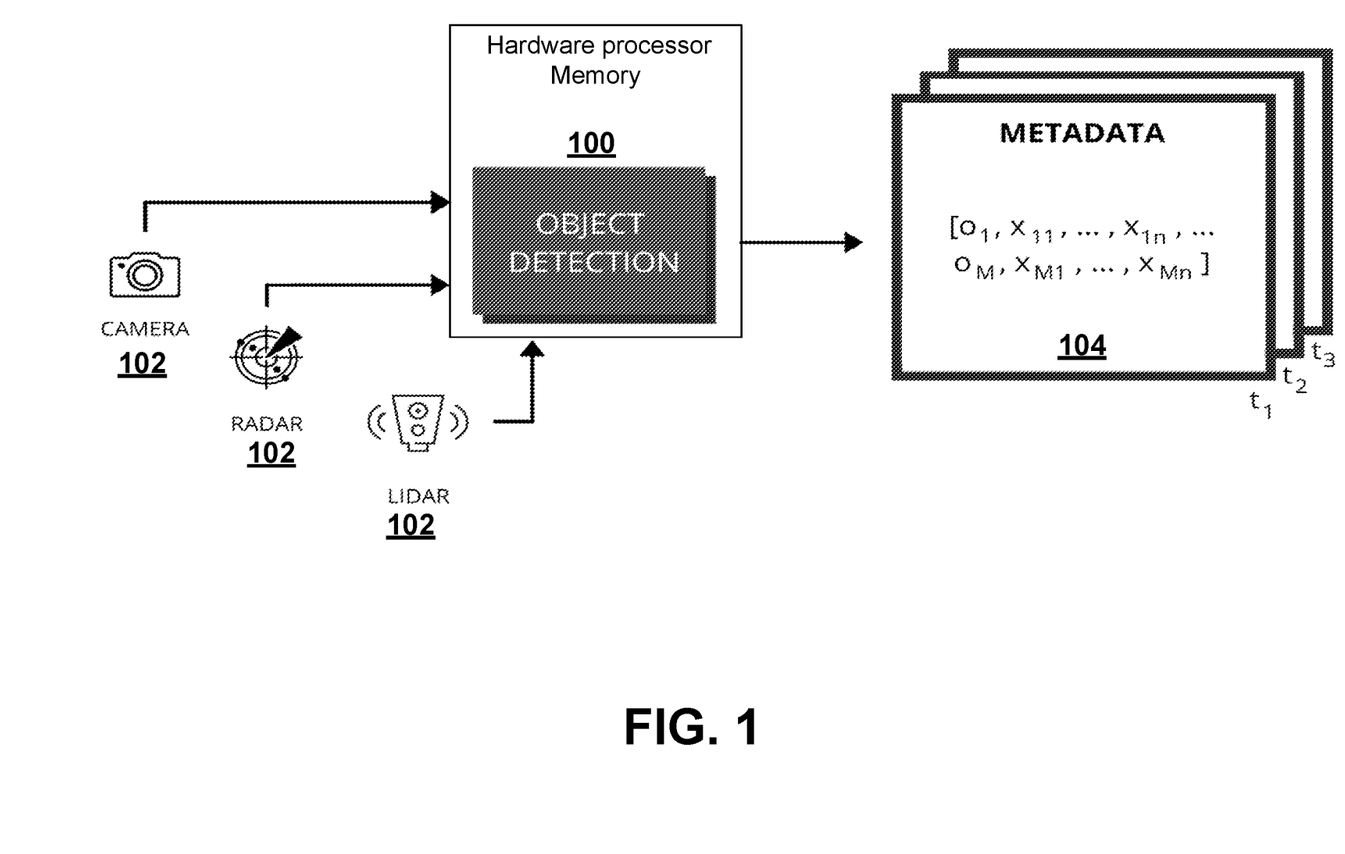
FIG. 1 is a diagram of a system for object detection showing input data and output data defining metadata for objects.

FIG. 1 is a diagram of a system with a hardware processor and memory storing an application for object detection 100 that receives input data captured by sensors 102.

The system can involve different hardware servers, databases stored on non-transitory memory, networks, and sensors 102. A hardware processor is communicatively coupled to non-transitory memory with application for object detection 100. The processor executes instructions or code for the application for object detection 100 to implement operations described herein. The hardware processor can be further communicatively coupled to sensors 102 via network. Thus, data may be transferred between the sensors 102 and the hardware processor by transmitting the data using network or connections. The hardware processor accesses the non-transitory memory (with computer readable storage medium) storing instructions to configure the processor using the application for object detection 100. There can be multiple hardware processors for collecting sensor data captured by sensors 102, and exchanging data and commands with other components of the system.

The processor can be referred to herein as an object detector. The application for object detection 100 configures the processor for detecting instances of objects in data captured by sensors 102. The processor and memory with the application for object detection 100 receives input data from different sensors 102. The data can be digital images or sequences of digital images captured by sensors 102 such as cameras, radars, or Lidar, for example. The data can be images generated by sensors 102 or point-cloud data generated by Lidar. Sensors 102 generate data defining spatial structure of the world. Groups of sensors 102 can sense spatial structure and generate data defining spatial structure. An example sensor 102 is an imaging sensor.

The processor and memory with the application for object detection 100 generates output data defining metadata 104 for objects. The metadata 104 can include output data over a series of time $t_1, t_2, t_3, \ldots, t_y$. The metadata 104 can define, for objects $o_1, o_2, \ldots, o_M$, different vectors or coordinates $[o_1, x_{11}, \ldots x_{1n} \ldots o_M, x_{M1} \ldots x_{Mn}]$ for the objects $o_1, o_2, \ldots, o_M$.

The system can involve a computing device to implement aspects of embodiments. The computing device includes at least one hardware processor, non-transitory memory (with the application for object detection 100), and at least one I/O interface, and at least one network interface for exchanging data. The I/O interface, and at least one network interface may include transmitters, receivers, and other hardware for data communication. The I/O interface can capture data for transmission to another device via network interface, for example.

Figure 2:
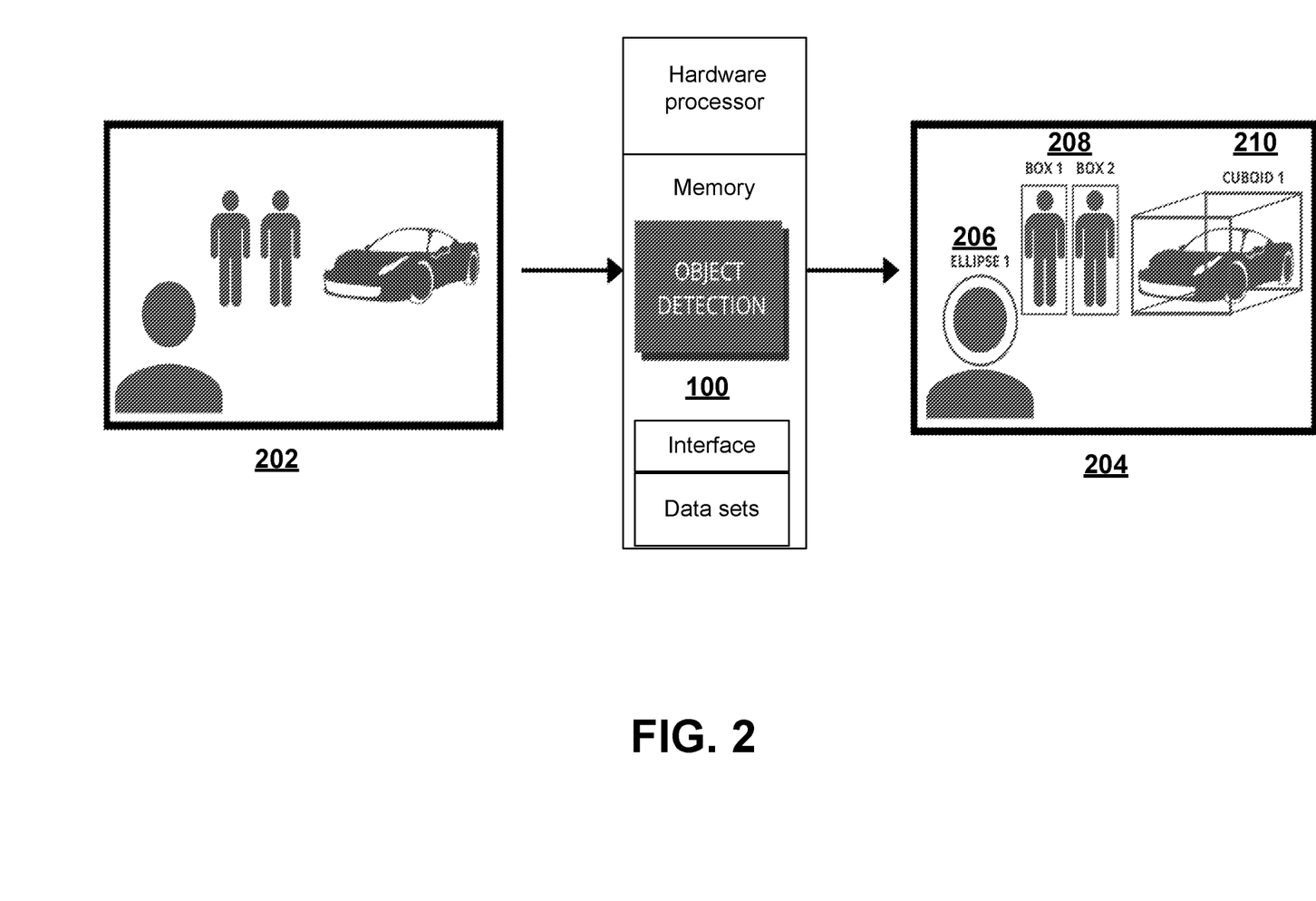
FIG. 2 is a diagram of a system for object detection showing output data defining objects.

FIG. 2 is a diagram of a system involving the processor and memory with the application for object detection 100 that receives sensor data 202. In this example, the sensor data 202 includes an image frame or video (e.g. multiple frames). The system for object detection 100 generates output data 204 that defines objects using different bounded regions or shapes, such as ellipses 206, boxes 208, cuboids 210. The bounded region defines an object detected by the system 100. The output data 204 can be displayed on an interface along with the sensor data 202.

The system for object detection 100 generates different interfaces for different applications or use cases. The interface can generate visual elements for bounding boxes to define an object within the sensor data 202. An example application is for security cases with a bounding box for a detected person which can trigger a rule that no people are allowed or someone is loitering. Other examples include statistics, analytics and counting purposes. The detected boxes can be used to determine how many people are detected to be moving through this space. Another application is for Vehicle Occupancy Detection. The system for object detection 100 generates data metrics for how many people are in the car (captured as sensor data 202) to determine if a particular vehicle is allowed to be in the HOV lane. Vehicle identifiers can be captured from the sensor data 202 and other vehicle metrics. The system for object detection 100 can integrate with autonomous vehicles to provide data metrics indicate where the objects are and how they are likely to travel. The system updates the interface coupled to the processor with visual elements for the output data to visually indicated the detected objects within a visualization of the sensor data. The elements may be bounding boxes for example to indicate people detected within the car.

The system for object detection 100 has a processor coupled to memory programmed with executable instructions for an interface to receive tracking data that defines the detected object within the sensor data 202. The object detection 100 detects the object within the sensor data 202 to generate the tracking data (e.g. output data 204). The object detection 100 can modulate its operations based on a location of the sensor data 202 and transmit the tracking data. The tracking data defines a spatial extent of the object. The tracking data can define a bounding region for the object within an image frame, for example. The tracking data can define the spatial extent of the object across different frames or segments of the sensor data. The tracking data can define the spatial extent of the object from different viewpoints or acquisition points based on the location of the sensor data 202. The tracking data is an example of output data 204 transmitted by the system for object detection 100. The object detection 100 modulates its operations by the location of the objects. The location is based on the presentation object within the sensor data 202. Based on the location, the objects will present in the sensor data in different ways.

In some embodiments, the system for object detection 100 uses a function that changes based on the location of the sensor data to process the sensor data for detecting the object. In some embodiments, the system for object detection 100 has a feature extractor to extract features from the sensor data 202 based on the location. Features can be extracted based on location, and then the system for object detection 100 can be trained based on the extracted features. During training, constraints can be imposed using different functions, such as a modulation function. The detector modulates and changes itself at different locations. The parameters can be trained. This can indirectly result in less parameters because the system can architect a smaller network. The network can be more powerful (it is more consistent with the data) so the system can make it smaller and which can execute more efficiently. The object detector can be produced using scene-aware pruning as an unsupervised method for training.

In some embodiments, the system for object detection 100 uses features or filters that modulate based on the location to process the sensor data for detecting the object. In some embodiments, the system for object detection 100 uses the features or filters by parameterizing features by the location. In some embodiments, the system for object detection 100 is a neural network based object detector. The object detector parameterizes transformation operations by the location. In some embodiments, the system for object detection 100 selects, for the location, an appropriate filter or transformation for parameterizing the filter operations.

In some embodiments, the system for object detection 100 implements unsupervised pruning of filters with low activations across layers of the neural network. The pruning can be performed at the location independently to remove different filters for the location.

Embodiments described herein provide a system method for producing or training the object detection 100. The system involves a processor coupled to memory storing executable instructions for causing the processor to define features or filters that modulate based on a location of a plurality of locations, and train the object detection 100 using training data processed based on the defined features or filters.

The system can involve a computing device to implement aspects of embodiments. The computing device includes at least one hardware processor, non-transitory memory (with the application for object detection 100), and at least one I/O interface, and at least one network interface for exchanging data. The I/O interface, and at least one network interface may include transmitters, receivers, and other hardware for data communication. The I/O interface can capture data for transmission to another device via network interface, for example.

Object Detection Frameworks

The following describes three example object detection frameworks or paradigms.

A first example object detection framework uses scanning-window detectors. This framework involves the dense scanning of a learned classifier at all locations and scales of an image. Dense scanning provides optimal performance. However, a standard VGA image with resolution of 640×480 scanned at increments of 4 pixel in location and at $2^{1/8}$ scale increments results in over 100,000 candidate scale-space locations. As a result, dense scanning is typically used with efficient classifiers built with Boosted Decision Trees, Random Forests or Support Vector Machines. Scanning-window detectors can be outperformed by Deep Learning frameworks. This framework results in a high-localization accuracy detector.

Another example object detection framework uses region-proposal detectors. The move towards high capacity neural network-based classifiers makes dense scanning computationally intractable. An alternative framework consists of generating a reduced number of candidate regions (typically below 1,000) for classifier evaluation. These candidate regions can be obtained using a number of different techniques but typically rely on an over-segmentation of the image and grouping of segments into regions based on saliency measures. The detected regions proposals are subsequently fed into the learned classifier. The region proposals have poor localization accuracy and as a result the classifier is trained to handle variations in locations within proposal windows.

Another example object detection framework uses fully-convolutional detectors. While region proposals improve the computational tractability of neural network-based detectors, detection on an image proceeds slowly: at rates of around 50-100 seconds per image (50 ms-100 ms for each of the 1000 neural net classifications) on modern CPUs. Fully-convolutional detectors attempt to address the problem by having a single neural network, trained directly for detection, process the image once. This is in contrast with evaluating a neural network, trained for classification, on 1000 image proposal regions. Fully-convolutional detectors achieve detection via a single neural network evaluation by relying exclusively on filter convolutions at each layer. These detectors can achieve comparable accuracy to region-proposal based detectors with a more than 10-fold reduction in computations are able to run at approximately 5 seconds per image (in their larger, higher performance instantiations) on modern CPUs.

Scene-Aware Detection

Detection frameworks involve detectors that localize and detect individual targets using repeated applications of the same operations or function at every location. For known approaches to object detection, every operation is repeated at every location. This can result in inefficient use of computing resources. In the case of scanning window detectors, the same classifier is applied at every scale-space location. In the case of region proposal detectors, the same classifier is repeatedly applied to each region proposal. Finally, fully-convolutional detectors are built on convolutional filters, which themselves consist of repeated applications of the same operations at all locations at any given layer (scale). Generally, different data feeds will be considered general data without any context (from a computer perspective) but in reality all data will have context from the real world.

Such an approach has the advantage of being able to detect objects regardless of the image or scene that is fed in. For example, objects can be readily detected in photography databases where the photographer(s) can be imaging scenes from any number of viewpoints.

However, in many real-world applications, sensors image a given scene from a particular viewpoint. Examples include: (a) a security camera in a public or office setting mounted at a certain height and pointed down at an angle (such as 45 degrees for example); (b) a ceiling mounted wide-angle (fisheye or panomorphic) security camera; (c) a front-view automotive collision warning camera or Lidar mounted to image the road.

In these cases, objects have very specific presentations related to the viewpoints. For instances, cars in a front-view automotive collision warning camera stream will have appearances that are starkly different from those that would be present in a 45 degree camera stream. Further, in a given scene, specific locations are directly tied to statistically significant presentations of objects. For instance, in a 45 degree camera stream monitoring a highway from an overpass bridge and pointed in the direction of the highway, vehicles appearing farther away from the camera and further up the image will be smaller, while vehicles appearing closer to the camera and further down the image will be larger. Similarly, a specific location in the scene (image) could for instance correspond to a crossing connecting both directions of travel: vehicles in this location would appear far more likely at a 90 degree viewpoint compared to other vehicles which under the majority of circumstances will be oriented in the highway's direction of travel. Finally, if a portion of the sky is imaged, vehicles are unlikely to appear in that location.

Embodiments described herein can receive data from any sensor (fixed or moving) that images the world from a consistent viewpoint. For example, this can be a sensor that is not hand-held.

Embodiments described herein factor context or scene into the detection process. Embodiments described herein impose a spatial prior on the sensor data, for example, as part of the detection process. For scene-aware detection, targets can be localized and detected by applications of different operations depending on the image location. There can be a set of operations (of the detector) at each location or the detector can be a function of location. For example, if x is the location, a function can be $f(x)$.

Detectors

Embodiments described herein provide a method applicable to different object detection frameworks such as scanning window detection, region proposal detection, and fully-convolutional detection.

Figure 3:
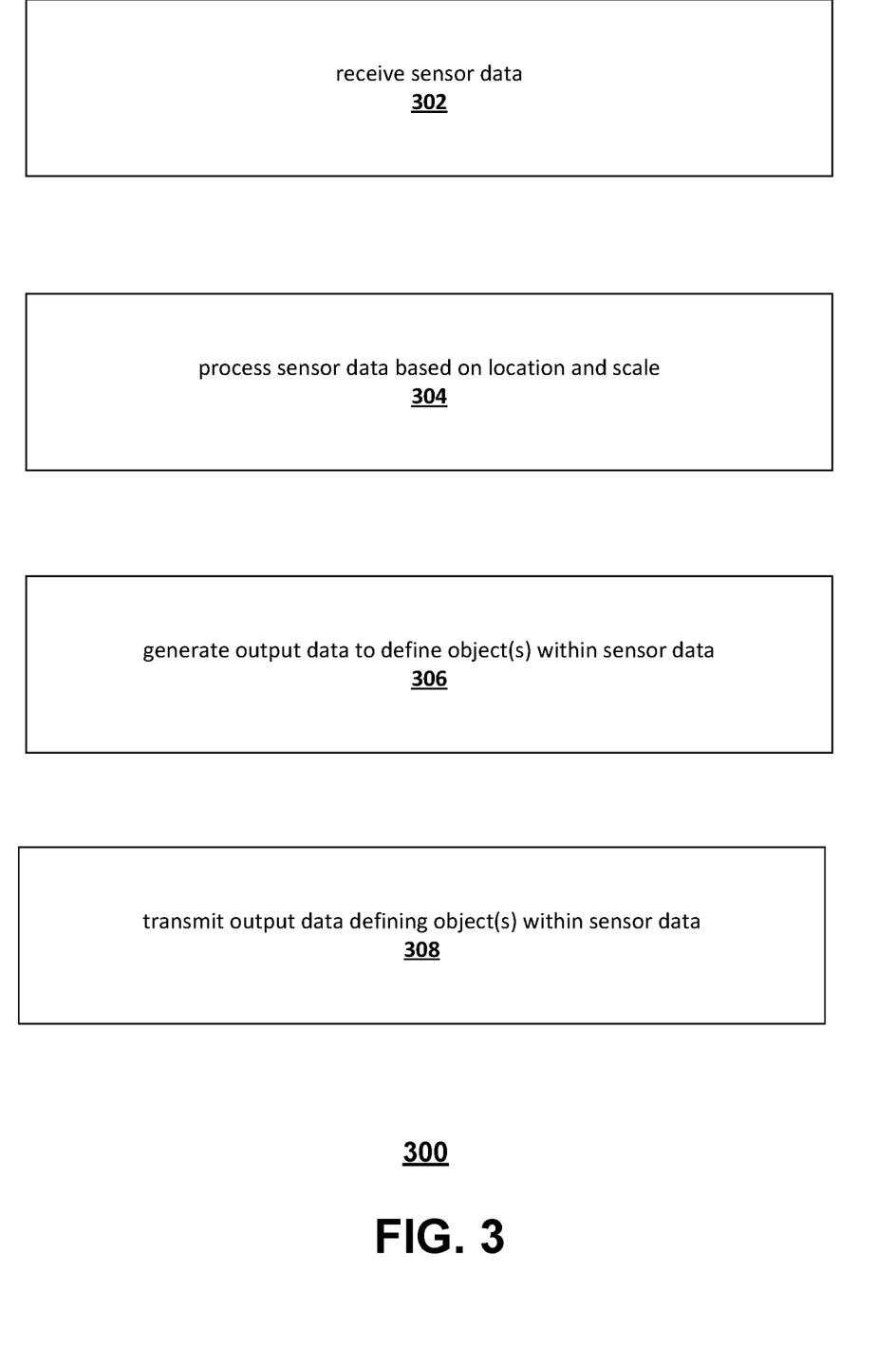
FIG. 3 is a flowchart diagram of a method for object detection.

FIG. 3 shows a flowchart diagram of an example method 300 for object detection. The method 300 involves receiving 302 sensor data from different sensors. The method 300 can detect a target object within sensor data associated with a location or viewpoint or acquisition point. The method 300 involves locating and quantifying a spatial extent of the target object within the sensor data using an object detector that modulates its operations based on the location. The method 300 can generate tracking data defining the spatial extent of the target object within the sensor data. The method 300 involves using an object detector that is context aware.

The method 300 involves processing 304 sensor data based on location. A feature extractor can extract features from the sensor data based on location and scale. For example, there can be an image with 4 locations (or pixels). Instead of training four separate object detectors for each location, embodiments described herein can involve modulating one object detector for the different locations. Embodiments described herein can modulate feature extraction based on location. For example, this can involve defining a function that changes based on location. Features can be extracted based on location and can be used as filters for the neural network. The method involves generating 306 output data that can include tracking data to define the spatial extent of the object within the sensor data. The method 300 involves transmitting 308 the output data that define objects within the sensor data. The data can be used to update an interface with visual elements corresponding to the objects. The visual elements can be responsive to the tracking data and defined regions that correspond to the objects.

The method 300 can involve processing 304 the sensor data to detect the object using an object detector that modulates its operations based on location of the sensor data. The method 300 involves generating 306 output data that defines the detected object within the sensor data based on the processed sensor data. The output data can define the object within the sensor data and across disparate sensor data streams.

In some embodiments, the method 300 can involve processing 304 the sensor data using a function that changes based on the location of the sensor data. In some embodiments, method 300 can involve processing the sensor data using a feature extractor to extract features from the sensor data based on the location for a neural network of the object detector. In some embodiments, method 300 can involve processing the sensor data using features or filters that modulate based on the location.

In some embodiments, method 300 can involve processing the sensor data by parameterizing features or filters by the location. In some embodiments, the method 300 involves selecting, for the location, an appropriate filter or transformation for parameterizing the filter operations using the object detector.

In some embodiments, the method 300 involves unsupervised pruning of filters with low activations across layers of a neural network of the object detector. The pruning can be performed at the location independently to remove different filters for the location.

There is a method for producing an object detector for detecting objects within sensor data, the object detector modulating its operations based on location of the sensor data. The method involves defining features or filters that modulate based on a location of a plurality of locations, and training the object detector using training data processed based on the defined features or filters. The trained detector can be used to detect objects for method 300. In some embodiments, the method involves defining the features or filters and parameterizing features by the location. In some embodiments, the object detector is a neural network based object detector, wherein training involves parameterizing transformation operations by the location. In some embodiments, training involves selecting, for the location, an appropriate filter or transformation for parameterizing the filter operations. In some embodiments, the method involves, for the location, unsupervised pruning of filters with low activations across layers of the neural network detector, the pruning being performed at each image location independently to remove different filters for different image locations.

The method 300 involves a detector that modulates its operations based on the image location. The detector can base the modulation of its operations on the observed presentations of objects in training data acquired from that specific consistent viewpoint. The detector is specialized to the given viewpoint and therefore might not be able to perform on arbitrarily oriented sensors. The detector can contain less parameters, therefore perform less computations and run faster whilst simultaneously achieving higher accuracy than its unspecialized counterpart.

In some embodiments, these detectors can be trained in a weakly supervised fashion whereby the target objects are labeled with bounding boxes alone without the need for more specific object pose (orientation) labels.

Scanning window detectors relying on Random Forests, Boosted Decision trees and SVMs, for example, can be specialized in this manner by considering their existing feature extractions. An example vector representation of features is:

$$V(x)=[v_1(x)v_2(x) \ldots v_M(x)], \text{ where } x \text{ is the image.}$$

An example image feature is the gradient magnitude of a smooth version of the image x:

$$v_j(x)=S(G(x,q(j))),$$

where $G(x, s)$ is a Gaussian smoothing filter with sigma s, and $S(y)$ returns the Sobel gradient magnitude of image y. Features can capture gradients at different scales through $q(j)$.

The method 300 can involve receiving 302 sensor data, such as an image, and extracting features of the image based on the image location, processing 304 the extracted features to detect an object, and generating 306 output data. No matter which features are extracted, the features can be modulated based on location. The detector will not extract features the same way at every location. The feature is a function of image, location, and scale. Known approaches for detection might only consider features are a function of the image. Embodiments described herein can define features as a function of image X, location L, and scale S. This results in extracting features that modulate based on location.

The method can parameterize with both the location and scale under consideration:

$$V(x,L,s)=[v_1(x,L,s)v_2(x,s) \ldots v_M(x,s)],$$

where x is the image, L is an image location and s is an image scale.

An example of a feature that modulates its operations based on image location and scale is $$v_j(x,L,s)=S(G(x,sg(j,L,s))),$$

where $sg(j, L, s)$ can modulate the smoothing sigma with the location L and scale s. This function $sg(j, L, s)$ can be learned. An example is to set $$sg(j,L,s)=s+z(j,L),$$

such that $z(j,L)$ returns sigmas close to zero for image locations where objects are likely to be of the same size, and a broader range of sigmas for image regions that can contain objects with more variation in size.

The function can be learned, hard-coded, or components of the function (e.g. $z(\ )$) can be learned.

The detector can be trained on features that modulate operations based on the image location. The detector detects the object using the extracted features that modulate based on location. The detector does not process the image or sensor data directly for object detection. Instead, the detector processes the extracted features that modulate based on location to generate the output data defining the detected objects. Typically, a detection process does not extract features that modulate based on location. Embodiments described herein extract features that modulate based on location. The detector, during training, can select the best features and in accordance with embodiments described herein, this includes the best modulation of features per location. Selection of features can depend on the algorithm used for object detection. For a method like Boosting or Random Forest, the best feature might be that which minimizes a loss (e.g. classification loss) over the training data. If the feature modulation function is fixed, then it automatically limits which features are available to minimize the loss. If the modulation function contains parameters to be learned, those parameters and the best feature can be chosen to minimize the loss.

Neural network based detectors, whether classical or region proposal and fully convolutional detectors, can be trained such that their specific convolutional filter operations and other operations are parameterized by location:

$$C_{nm}(l) = \begin{bmatrix} p_{11}(L) & p_{12}(L) & \ldots & p_{1kw}(L) \\ \vdots & & \ddots & \vdots \\ p_{kh1}(L) & p_{kh2}(L) & \ldots & p_{khkw}(L) \end{bmatrix},$$

where kw, kh are kernel width and height respectively and where $C_{nm}$, is the $m^{th}$ operation (convolutional or otherwise) performed in the $n^{th}$ layer.

While feature-based methods rely on the scale of each feature to be specified explicitly, this might not be the case for Convolutional Neural Nets (CNNs). CNNs encode scale through the use of pooling operations, such as max pooling or average pooling, for example. Every time a pooling operator is applied, the resolution of the image is reduced, which is equivalent to reducing the scale of the image. Therefore, the scale at which a filter operates is not up to the filter itself, but instead depends on where in the processing pipeline the filter is found. For fully CNNs for example, at every layer, the training process will select a convolutional filter. This filter which is selected is then convolved with the activations of the previous layer. This operation of convolving a filter is nothing more than multiplying the filter with the value in the underlying activation map, shifting the filter by a set amount, and repeating.

The exact parameterization to be used can vary. The parameterization selection can be based on the problem in order to select a parameterization that fits the problem. For example, for a top-view camera, a selected parameterization can be a rotation based on the angle relative to a frame of reference that is located in the center of the image.

During a training stage, constraints can impose for instance that specific locations correspond to in-plane rotations of the filter (image) by an angle of θ, that are to be learned based on training data, such that $$C_{nm} \to C_{nm}(\theta(L)),$$

whereby $C_{nm}(\theta(L))$ is rotation of $C_{nm}$ by θ.

The training stage can involve selecting different options for constraints and then training the detector so that it is location aware given that the constraints are based on location.

Alternatively a family of filters could be defined arbitrarily at random or following a specific structure and the training process can be modified to select at each location/ the most appropriate filter or transformation.

The training process can select every other parameter. In an example scenario, the convolutional filter in the neural network can be determined at the end of the training process through the process of gradient descent. For this specific, example case, the network could simultaneously learn multiple filters (eg. 10) instead of 1 and in addition, we add another parameter, say s=1.10, which specifies which filter will be applied at which location. The training process can then simultaneously choose which filter to apply as well as the exact parameters of the filter.

Scene-Aware Detection and Computational Speed on Hardware Platforms

The repeated operations of Neural Network are well suited for modern hardware such as GPUs and others that are designed for parallel processing of data. On such platforms, the data is typically divided into blocks, each block is sent to one of hundreds to thousands of parallelized cores for the application of the same operation simultaneously. In the case of images for example, the image can be broken down into tiles while each core runs a given convolutional filter. This allows for the operation to be executed much faster than on other more sequential hardware such as CPUs.

In the case of scene-aware detection, the convolutional filter or operation in question, being parameterized by image location differs from location to location and cannot be parallelized as efficiently. While a differing operation across tiles can be handled with increased memory and indexing (i.e. providing each computational core with the information necessary to derive its own operation either from a set of operations or formulaically), the operations within each tile need to be the same. Imposing a slow-varying parameterization with location (such that neighboring locations are parametrized identically) can largely recover the performance loss due to location parametrization (with only the additional operations due to indexing remaining and increased memory associated with such indexing).

A slow-varying parameterization can be achieved by adding a function:

$$L' \to SLOW(L)$$

Where SLOW(L) can be any function that outputs the same L' for a group of neighboring L values. Assuming, L=(x,y) for 2-dimensional images, we could have:

$$(x', y') = SLOW(x, y) = \left(\left\lfloor \frac{x}{M} \right\rfloor, \left\lfloor \frac{y}{M} \right\rfloor\right)$$

This can ensure uniform values for tiles of size M×M.

Scene-Aware Pruning

Scene-aware detection might assume the existence of training data for the specific scene view. This can be hard to accomplish with real-data as there are innumerable possible viewpoints and scenes. One possibility would be to use simulated data. However, it might not be desirable to simulate or acquire and label data from a specific viewpoint. The system can receive data from sensors located at different viewpoints, for example. The sensor data can be linked to different locations or viewpoints based on the location or viewpoint of the sensor that generated the respective sensor data. This sensor data can be used to train the object detector for different locations.

At the same time, general datasets are widely available which can produce a complex neural network-based detector capable of performing well on arbitrary viewpoints because they are trained with a large amount of data and have lots of parameters. Unsupervised pruning can be applied to such a model whereby for example, filters across all layers with low activations are pruned from the network. This can be applied at each location independently such that different features or filters are removed for different locations resulting in a very compact network that is specialized to the given scene. The pruning can be applied to the features of scanning window detectors relying on Random Forests, Boosted Decision trees and SVMs.

Pose-Indexing, Heuristics, Early-Stopping

Scene-Aware detection as described here is distinct from unsupervised pose-indexing and spatial transformer networks. Unsupervised pose-indexing and spatial transformer networks produce detectors that modulate their operations based on pose estimates of the evaluated region. These frameworks are not scene-aware as the same operations are repeated at every scene location.

Early-stopping of detector evaluation can be considered a form of detector modulation at every scene location. However, it is not a scene-aware operation as the same criteria for early stopping is used at every scene location.

Combining object detection with other techniques such as ground-plane estimation or even user input in order to restrict areas in the image where the detector is evaluated, which have no form of joint and unsupervised learning, is also not a scene-aware framework. For example, ground-plane estimation might not run a detection if the images are of "sky" as opposed to images of "road".

As shown in FIG. 1, object detection 100 receives input data from asynchronous data streams generates by different types of sensors 102. Object detection 100 can be implemented independently and separately for each of the input data streams. The object detection 100 can operate on fused data in some embodiments.

The system for object detection 100 can include an I/O Unit, a processor, communication interface, and data storage. The processor can execute instructions in memory to implement aspects of processes described herein. The processor can execute instructions in memory to configure the object detector, and other functions described herein. The system may be software (e.g., code segments compiled into machine code), hardware, embedded firmware, or a combination of software and hardware, according to various embodiments.

The I/O unit can enable the system to interconnect with one or more input devices or sensors 102, such as a camera, touch screen and a microphone, and/or with one or more output devices such as a display screen and a speaker.

Memory may include a suitable combination of any type of computer memory that is located either internally or externally. Data storage devices can include memory, databases (e.g. graph database), and persistent storage.

The communication interface can enable the system to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system can be operable to register and authenticate users (using a login, unique identifier, and password for example) prior to providing access to applications, a local network, network resources, other networks and network security devices. The system can connect to different machines, entities, and/or data sources (linked to databases).

The data storage may be configured to store information associated with or created by the system, such as for example image or video data. The data storage may be a distributed storage system, for example. The data storage can implement databases, for example. Storage and/or persistent storage may be provided using various types of storage technologies, such as solid state drives, hard disk drives, flash memory, and may be stored in various formats, such as relational databases, non-relational databases, flat files, spreadsheets, extended markup files, and so on.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in hardware, software, or a combination thereof. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for detecting an object within sensor data, the system comprising a hardware processor coupled to non-transitory memory programmed with executable instructions for an interface to receive tracking sensor data that defines the detected object within the sensor data from a viewpoint; and an object detector for detecting the object within the sensor data by modulating and changing its operations based on a location of a plurality of locations in the sensor data to generate output data defining a spatial extent of the object in the sensor data based on the location, wherein the object presents in the sensor data in different ways based on the location, the object detector configured to transmit the output data defining the spatial extent of the object in the sensor data based on the location.

2. The system of claim 1 wherein the object detector operates by a function that changes based on the location in the sensor data to process the sensor data for detecting the object.

3. The system of claim 1 further comprising a feature extractor to extract features from the sensor data based on the location for the object detector.

4. The system of claim 1 wherein the object detector uses features or filters that modulate based on the location to process the sensor data for detecting the object.

5. The system of claim 4 wherein the object detector uses the features or filters by parameterizing features by the location.

6. The system of claim 1 wherein the object detector is a neural network based object detector, wherein the object detector parameterizes transformation operations by the location.

7. The system of claim 1 wherein the object detector selects, for the location, an appropriate filter or transformation for parameterizing the filter operations.

8. The system of claim 1 wherein the object detector is a neural network based object detector, wherein the object detector implements unsupervised pruning of filters with low activations across layers of the neural network, the pruning being performed at the location independently to remove different filters for the location.

9. A computer implemented method for detecting an object within sensor data, the method comprising:
processing the sensor data using a processor that accesses non-transitory memory storing the sensor data to detect the object by an object detector that modulates and changes its operations based on a location in the sensor data, wherein the object presents in the sensor data in different ways based on the location;
generating, using the processed sensor data, output data that defines a spatial extent of the detected object within the sensor data based on the location;
updating an interface coupled to the processor with visual elements for the output data to visually indicate the detected objects within a visualization of the sensor data based on the location.

10. The method of claim 9 wherein processing the sensor data comprises using a function that changes based on the location in the sensor data.

11. The method of claim 9 wherein processing the sensor data comprises using a feature extractor to extract features from the sensor data based on the location for a neural network of the object detector.

12. The method of claim 9 wherein processing the sensor data comprises using features or filters that modulate based on the location.

13. The method of claim 9 wherein processing the sensor data comprises parameterizing features or filters by the location.

14. The method of claim 9 comprising selecting, for the location, an appropriate filter or transformation for parameterizing the filter operations using the object detector.

15. The method of claim 9 comprising unsupervised pruning of filters with low activations across layers of a neural network of the object detector, the pruning being performed at the location independently to remove different filters for the location.

16. A system for producing an object detector for detecting objects in sensor data, the object detector modulating and changing its operations based on different locations in the sensor data, the system comprising:
a processor coupled to memory storing executable instructions for causing the processor to define features or filters that modulate based on a location of a plurality of locations, and train the object detector using training data processed based on the defined features or filters to configure the object detector to modulate and change its operations based on the location of the plurality locations in the sensor data to generate output data defining a spatial extent of the object in the sensor data based on the location, wherein the objects present in the sensor data in different ways based on the plurality of locations.

17. The system of claim 16 wherein defining the features or filters involves parameterizing features by the location.

18. The system of claim 16 wherein the object detector is a neural network based object detector, wherein training involves parameterizing transformation operations by the location.

19. The system of claim 16 wherein training involves selecting, for the location, an appropriate filter or transformation for parameterizing the filter operations.

20. The system of claim 16 comprising, for the location, unsupervised pruning of filters with low activations across layers of the neural network detector, the pruning being performed at each image location independently to remove different filters for different image locations.

* * * * *